(12) United States Patent
Revach et al.

(10) Patent No.: US 11,048,372 B2
(45) Date of Patent: Jun. 29, 2021

(54) APPLYING A DEGREE OF TRANSPARENCY

(71) Applicant: ENTIT SOFTWARE LLC, Sanford, NC (US)

(72) Inventors: Eli Revach, Yehud (IL); Elad Levi, Yehud (IL); Amos Nesher, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 125 days.

(21) Appl. No.: 15/545,820

(22) PCT Filed: Feb. 12, 2015

(86) PCT No.: PCT/US2015/015562
§ 371 (c)(1),
(2) Date: Jul. 24, 2017

(87) PCT Pub. No.: WO2016/130125
PCT Pub. Date: Aug. 16, 2016

(65) Prior Publication Data
US 2018/0004358 A1     Jan. 4, 2018

(51) Int. Cl.
*G06F 3/0481*    (2013.01)
*G06F 3/0484*    (2013.01)
(Continued)

(52) U.S. Cl.
CPC ........ *G06F 3/0481* (2013.01); *G06F 3/04842* (2013.01); *G06F 3/04886* (2013.01); *G06F 3/04897* (2013.01); *G06F 2203/04804* (2013.01)

(58) Field of Classification Search
CPC .............. G06F 3/0481; G06F 3/04897; G06F 3/04886; G06F 3/04842; G06F 2203/04804
See application file for complete search history.

(56) References Cited

U.S. PATENT DOCUMENTS 6,002,397 A * 12/1999 Jaaskelainen, Jr. ...... G09G 5/14
                                                           715/797
6,405,204 B1 * 6/2002 Baker .................... G06Q 30/02
                                                           705/36 R
(Continued)

FOREIGN PATENT DOCUMENTS

WO       WO-0115127       3/2001

OTHER PUBLICATIONS

International Searching Authority, the International Search Report and Written Opinion; PCT/US2015/015562; dated Nov. 12, 2015; 14 pages.

(Continued)

*Primary Examiner* — Daniel W Parcher

(57) ABSTRACT

Implementations disclosed herein relate to a device for applying a degree of transparency. The device may comprise a display engine to display a foreground and background area, wherein the background area is associated with a first application and the foreground area is associated with a second application. The device may further comprise a transparency engine to apply a degree of transparency to the foreground area in an overlap area between the foreground area and the background area. The device may further comprise a trigger engine to determine whether a trigger event associated with the first application has occurred, wherein the trigger event is based on a metric value received by the first application, and in response to determining that the triggering event associated with the first application has occurred, cause the display engine to display the first application in front of the second application.

17 Claims, 7 Drawing Sheets

(51) Int. Cl.
*G06F 3/0488* (2013.01)
*G06F 3/0489* (2013.01)

(56) References Cited

U.S. PATENT DOCUMENTS

| | | | |
|---|---|---|---|
| 7,146,573 | B2 | 12/2006 | Brown et al. |
| 7,429,993 | B2 | 9/2008 | Hui et al. |
| 7,956,869 | B1 * | 6/2011 | Gilra ............... G06F 3/0481 |
| | | | 345/592 |
| 8,191,003 | B2 | 5/2012 | Brown et al. |
| 8,659,615 | B2 | 2/2014 | Martyn et al. |
| 2002/0089546 | A1 * | 7/2002 | Kanevsky ......... G06F 3/0481 |
| | | | 715/800 |
| 2003/0055908 | A1 * | 3/2003 | Brown ............... H04L 29/06 |
| | | | 709/207 |
| 2003/0070182 | A1 * | 4/2003 | Pierre .................. H04N 5/76 |
| | | | 725/135 |
| 2003/0142109 | A1 | 7/2003 | Brown et al. |
| 2004/0061716 | A1 | 4/2004 | Cheung et al. |
| 2006/0061597 | A1 | 3/2006 | Hui |
| 2008/0109384 | A1 * | 5/2008 | Preston ............... G06Q 40/06 |
| | | | 705/36 R |
| 2008/0163082 | A1 | 7/2008 | Rytivaara et al. |
| 2008/0295020 | A1 * | 11/2008 | Haynes ................ G06F 9/451 |
| | | | 715/781 |
| 2009/0138811 | A1 * | 5/2009 | Horiuchi ........... G06F 3/04842 |
| | | | 715/768 |
| 2011/0283226 | A1 * | 11/2011 | Basson ................ G06F 9/453 |
| | | | 715/794 |
| 2013/0104061 | A1 * | 4/2013 | Engel .................... G09G 3/20 |
| | | | 715/761 |
| 2013/0304910 | A1 * | 11/2013 | Hanlon ............... G06Q 10/06 |
| | | | 709/224 |
| 2013/0347002 | A1 * | 12/2013 | Basu .................... G06F 9/485 |
| | | | 718/107 |
| 2014/0075332 | A1 * | 3/2014 | Jeon ................ H04M 1/72552 |
| | | | 715/752 |
| 2014/0195933 | A1 | 7/2014 | Rao et al. |
| 2014/0289650 | A1 | 9/2014 | Cotlarciuc |
| 2015/0277675 | A1 * | 10/2015 | Firestone ........... G06F 3/0482 |
| | | | 715/789 |

OTHER PUBLICATIONS

Softpedia, Make Application Windows Transparent, Unknown Date, 3 pages http://www.softpedia.com/reviews/windows/GhostWin-Review-209144.shtml.

* cited by examiner

APPLYING A DEGREE OF TRANSPARENCY

BACKGROUND

A typical computing device, such as a personal computer, laptop computer, or mobile phone, may allow for execution of a significant number of applications, each for accomplishing a particular set of tasks. Many users may frequently switch between a number of these applications, but need to remain aware of what is occurring in other applications. For example, a user may need to monitor the status of an IT system or a stock chart while also checking and responding to incoming emails. A first application displayed in a background area (e.g., an application displaying monitoring metrics such as stock prices, system resource consumption, application performance, order tracking, etc.) may occupy a large portion of a user's screen but be obscured by a second application displayed in a foreground area (e.g., a web browser, movie player, email client, word processor, etc.) in active use by a user. The need of the user to switch back and forth between the first and second applications may interfere with the user's activity in the second application. In such a scenario, the application in the foreground area (e.g., an e-mail client) may be displayed with a degree of transparency to allow the application in the background area (e.g., a monitoring application) to be viewed as well.

BRIEF DESCRIPTION OF THE DRAWINGS

In the accompanying drawings, like numerals refer to like components or blocks. The following detailed description references the drawings, wherein.

DETAILED DESCRIPTION

As described above, an application user interface for monitoring metric data may occupy a large portion of most displays and the need to continuously review incoming data may interfere with a user's ability to perform tasks in other applications. Accordingly, as described in detail below, various example implementations relate to applying transparency in application user interfaces. For example, a user interface for a first application may be displayed in a background area behind a user interface for a second application that has had a degree of transparency applied.

In some implementations, this degree of transparency may help prevent the obscuring of the first application, such as a monitoring application. In this manner, a user may easily check the status of the monitoring application while continuing to perform other actions in the second application. Additional implementations will be apparent to those of skill in the art upon reading and understanding the following description.

In the description that follows, reference is made to the term, "machine-readable storage medium." As used herein, the term "machine-readable storage medium" refers to any electronic, magnetic, optical, or other physical storage device that stores executable instructions or other data (e.g., a hard disk drive, random access memory, flash memory, etc.).

Figure 1:
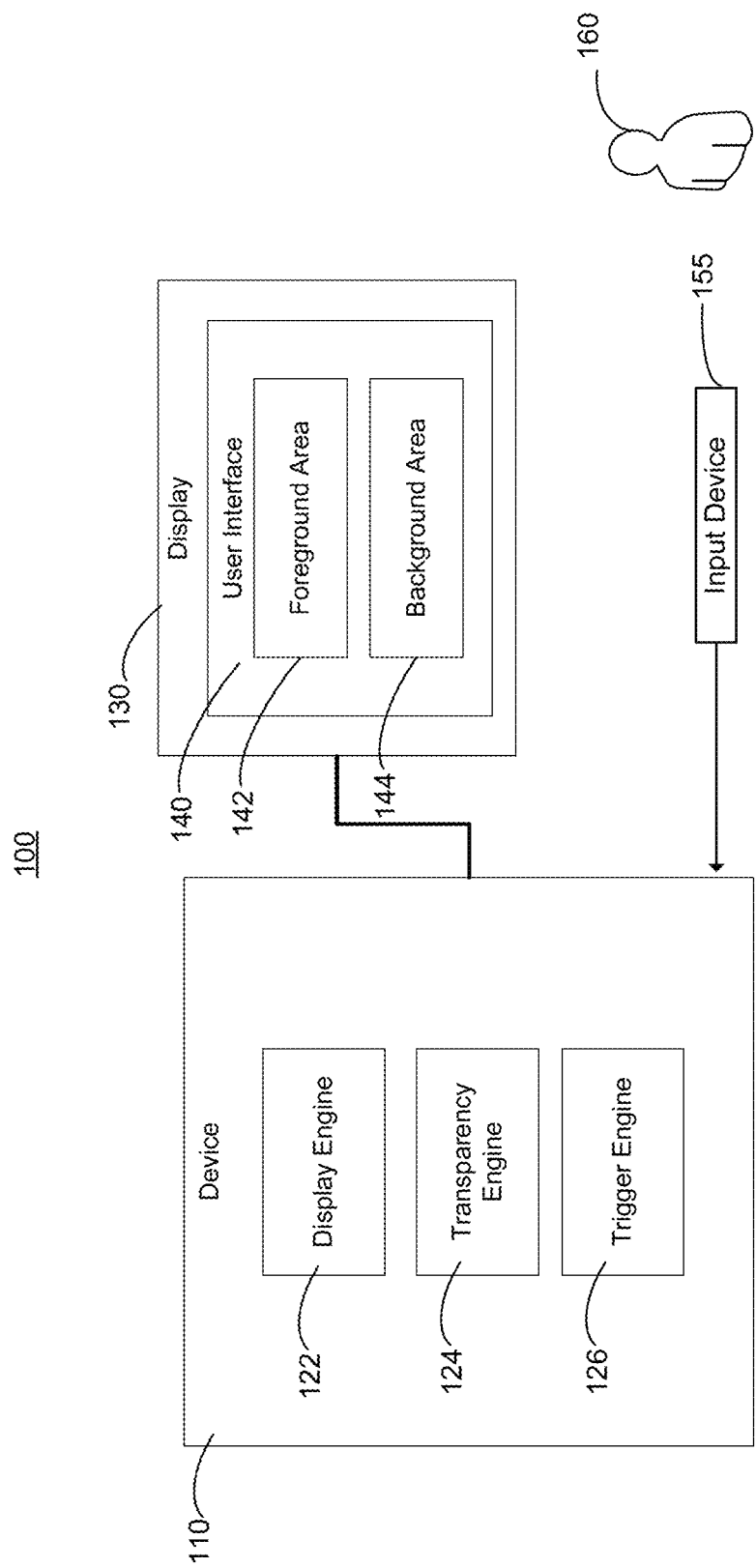
FIG. 1 is a block diagram of an example system for applying a degree of transparency consistent with disclosed implementations.

Referring now to the drawings, FIG. 1 is a block diagram of an example system 100 for applying a degree of transparency consistent with disclosed implementations. System 100 may be implemented in a number of different configurations without departing from the scope of the disclosed examples.

In the example shown in FIG. 1, system 100 may comprise a device 110, a display 130, an input device 155, and a user 160. System 100 may comprise, for example, a computing device such as a desktop computer, a laptop computer, a handheld computing device, a mobile phone, or the like.

Device 110 may comprise a display engine 122, a transparency engine 124, and/or a trigger engine 126 to implement the functionality described in detail below. Device 110 may be coupled to display 130 comprising a user interface 140 with a foreground area 142 displayed in front of a background area 144.

Display engine 122, transparency engine 124, and trigger engine 126 may be electronic circuitry for implementing functionality consistent with disclosed examples. For example, engines 122, 124, and 126 may represent combinations of hardware devices and programming to implement functionality consistent with disclosed implementations. For example, the programming for the engines may be executable instructions stored on a non-transitory machine-readable storage medium and the hardware for the engines may include at least one processor to execute those instructions. The instructions may comprise, for example, at least a portion of an operating system (OS) of system 100 or a separate application running on top of the OS to present a user interface. As another example, the executable instructions may be included in a web browser, such that the web browser implements the interface described in detail herein. In some implementations, the executable instructions may be implemented in web-based script interpretable by a web browser, such as JavaScript. Other suitable formats of the executable instructions will be apparent to those of skill in the art.

Display engine 122 may display foreground area 142 and background area 144 in user interface 140. In some implementations, background area 144 may be associated with a first application, such as a monitoring application, and foreground area 142 may be associated with a second application, such as an active user application.

In some implementations, the foreground area 142 may be associated with an active user application, such as an e-mail application, web browser application, productivity applications, media editors and/or players, and any other software that may be executed by system 100. In some implementations, the background area 144 may be associated with a monitoring application that processes and displays updates associated with measurement metrics. For example, a stock ticker application may receive periodic updates on prices for various stocks and display a chart of those prices for a given period and/or a server load application may display updates of resources such as memory, disk space, bandwidth, etc. in use on one and/or more servers.

Such applications may be stored on device 110, a remote server, or on some other storage medium that may be accessed by device 110. In addition, the applications accessible to device 110 may include web pages or web-based applications. As an example, the applications may include web-based social networking applications, web-based email, news or sports websites, blogs, and the like. Regardless of the particular applications accessible to device 110, foreground area 142 and background area 144 may display a number of these applications and allow for user selection of either area.

Transparency engine 124 may apply a degree of transparency to foreground area 142 in an overlap area with background area 144. The application of transparency may aid a user in viewing and interacting with multiple applications. Transparency may allow at least some elements of the background area to be simultaneously visible even when the foreground area 142 occupies an overlapping section of an overall display. For example, background area 144 may comprise a first application window situated behind foreground area 142 that may comprise a second application window. Transparency engine 124 may apply a degree of transparency to foreground area 142 such that background area 144 is visible through foreground area 142.

Transparency in user interface areas may be achieved by several techniques. Transparent pixels may be used by rendering certain pixels in the foreground area transparent such that those pixels are instead used to display the corresponding pixel of the background area. The degree of transparency in this case may thus refer to the percentage of pixels rendered transparent (e.g., a transparency degree of 33% may equate to rendering every third pixel of the foreground area transparently.)

Another technique for applying a degree transparency may include the use of clipping paths around the elements of the foreground area, whereby everything inside the path is visible, and everything outside the path is invisible. A third technique for applying transparency comprises the use of alpha compositing. Alpha compositing is the process of combining an image with a background to create the appearance of partial or full transparency. The foreground and background areas may be rendered in separate passes, and then the resulting images may be combined into a single, final image called the composite. Other techniques for applying transparency to interface areas may be used, such as those provided by graphics rendering hardware and software associated with computers such as user device 110.

Trigger engine 126 may determine whether a trigger event associated with a monitoring application has occurred, and in response to determining that the triggering event associated with the monitoring application has occurred, cause display engine 122 to display the monitoring application in foreground area 142 instead of background area 144. A trigger event may comprise trigger engine 126 determining that a metric received by a monitoring application comprises an abnormal value according to a trigger rule.

In some implementations, the metrics may comprise a series of measurement values associated with a monitored condition, such as computing resources in use, weather conditions, stock prices, etc. The plurality of metrics may be received over time as the measurements are made and/or may be received in batches of sequential and/or sampled measurements. For example, a trigger event may occur when a stock trades at a price greater than a threshold value in a trigger rule and that price is received by the application and analyzed by trigger engine 126.

In some implementations, trigger engine 126 may create a trigger rule. For example, trigger engine 126 may receive a plurality of metric values associated with the monitoring application and analyze the metrics to create a trigger rule. For another example, trigger engine 126 may identify a user selection of the monitoring application in background area 144 and associate at least one of the metrics with the user selection of the monitoring application.

Trigger engine 126 may create the trigger rule based on the metric values establishing thresholds for abnormal values. In some implementations, a default change amount may be used to establish the trigger rule, such as +/−10% of an initial metric value, and the range may be adjusted as more metric values are received and analyzed. For example, if a given metric routinely varies by more than 20%, then the range sleeve may be expanded to encompass a broader range of values that may be considered normal rather than abnormal. In some implementations, user activity may be tracked to aid in identifying abnormal values. For example, if a first application receives and/or displays a new metric value, and user 160 switches from a second application to the first application via input device 155 to retrieve details about the new metric value, the metric analysis may designate the new metric value an abnormal value and create a new trigger rule associated with that value Once trigger engine 126 has created a trigger rule, trigger engine 126 may receive a second plurality of metrics associated with the monitoring application and determine whether any of the second plurality of metrics comprise an abnormal value according to the trigger rule. In some implementations, determining whether one of the second plurality of metrics comprises an abnormal may comprise determining whether a threshold number of subsequent metrics of the second plurality of metrics comprise abnormal values. For example, a single abnormal value may not be enough to satisfy the trigger rule, but three consecutive abnormal values may. In some implementations, the trigger rule may comprise a range sleeve associated with a range of normal values (e.g., a stock price range of $20-$25 per share).

User 160 may interact with device 110 via an input device 155 such as a mouse, a keyboard, a touchpad, and/or a microphone. It should be apparent, however, that any suitable input device may be used, provided that user 160 may communicate instructions to device 110. Input device 155 may be internal or external to device 110 depending on the configuration of device 110.

In some implementations, trigger engine 126 may comprise instructions for analyzing and correlating data associated with a series of metric values associated with an application executed by user device 100. For example, a stock ticker application may periodically receive a metric value comprising a current price of a particular stock. Over a period of time, the metric analysis may identify a normal range of expected values, such as by identifying an average daily percentage and/or absolute value change. This range of expected values may comprise a range sleeve representing a threshold amount above or below an average value that would comprise an abnormal value. For example, a stock price metric with an average value of $20.00 may comprise a range sleeve of $18.00-$22.00, or +/−10%. Any metric falling outside that range sleeve may comprise an abnormal value.

The metric analysis may create a trigger rule based on the metric values establishing thresholds for abnormal values. In some implementations, a default change amount may be used to establish the trigger rule, such as +1-10% of an initial metric value, and the range may be adjusted as more metric values are received and analyzed. For example, if a given metric routinely varies by more than 20%, then the range sleeve may be expanded to encompass a broader range of values that may be considered normal rather than abnormal. In some implementations, user activity may be tracked to aid in identifying abnormal values. For example, if a first application receives and/or displays a new metric value, and user 160 switches from a second application to the first application via input device 155 to retrieve details about the new metric value, the metric analysis may designate the new metric value an abnormal value and create a new trigger rule associated with that value.

Trigger engine 126 may receive metric values associated with a monitoring application and evaluate those values against the created trigger rules. A metric value that is found to comprise an abnormal value according to the created trigger rules may result in trigger engine 126 causing the display engine 122 to swap a monitoring application being displayed in background area 144 to be displayed in foreground area 142 instead. In some implementations, an application that had been displayed in foreground area 142 may be moved to background area 144 behind the monitoring application. In some implementations, trigger engine 126 may make the monitoring application the active and/or focus window.

Figure 2:
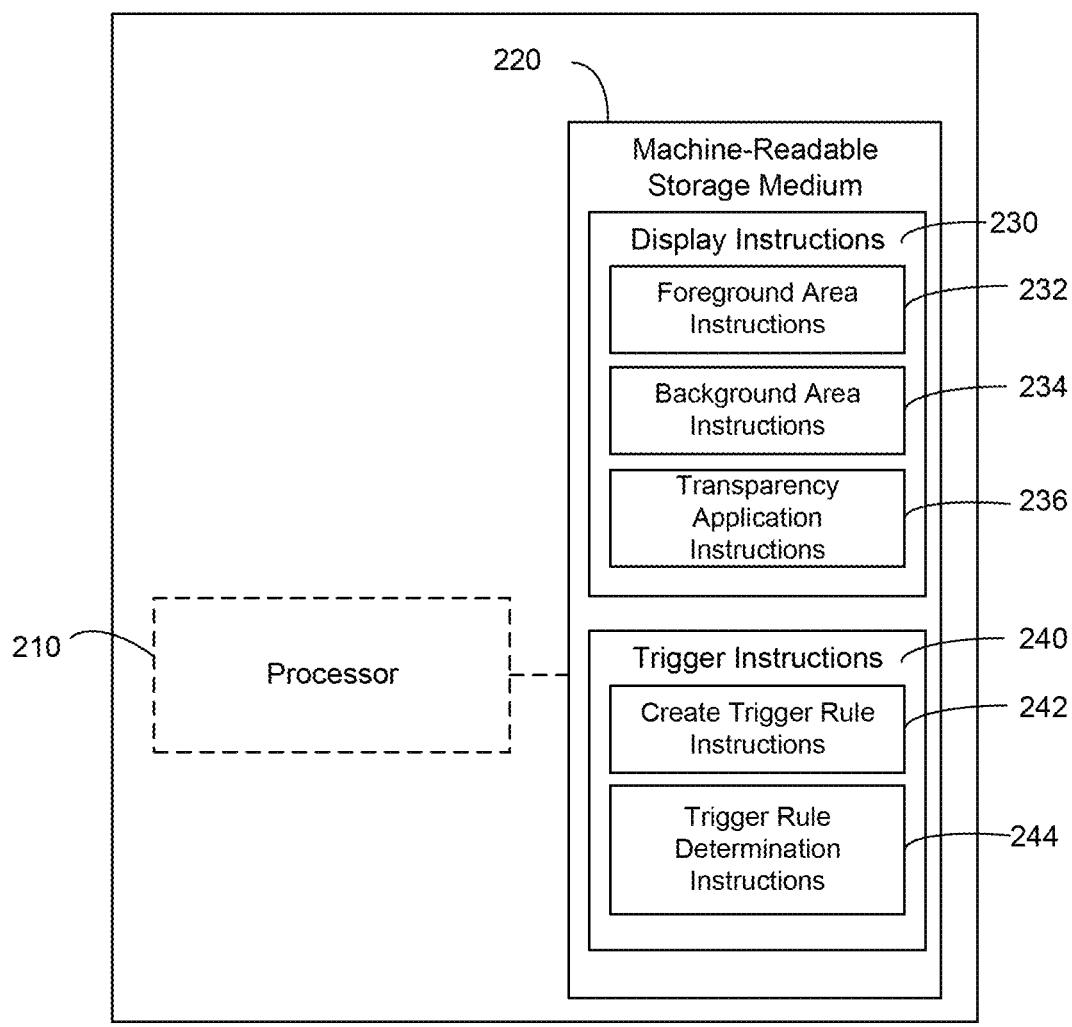
FIG. 2 is a block diagram of an example user device consistent with disclosed implementations.

FIG. 2 is a block diagram of an example user device 200 consistent with disclosed implementations. In certain aspects, user interface display device 200 may correspond to user device 100 of FIG. 1. User interface display device 200 may be implemented in various ways. For example, device 200 may be a special purpose computer, a server, a mainframe computer, and/or any other type of computing system. In the example shown in FIG. 2, user interface display device 200 may include a processor 210 and a machine-readable storage medium 220.

Processor 210 of FIG. 2 may comprise a central processing unit (CPU), a semiconductor-based microprocessor, or any other hardware device suitable for retrieval and execution of instructions stored in machine-readable storage medium 220. In particular, processor 210 may fetch, decode, and execute display instructions 230 (e.g., instructions 232, 234, and/or 236) and/or trigger instructions 240 (e.g., instructions 242, 244, and/or 246) stored in machine-readable storage medium 220 to implement the functionality described in detail below.

Machine-readable storage medium 220 may be any electronic, magnetic, optical, or other physical storage device that stores executable instructions. Thus, machine-readable storage medium 220 may be, for example, memory, a storage drive, an optical disc, and the like. In some implementations, machine-readable storage medium 220 may be a non-transitory machine-readable (e.g., computer-readable) storage medium, where the term "non-transitory" does not encompass transitory propagating signals. Machine-readable storage medium 220 may be encoded with instructions that, when executed by processor 210, perform operations consistent with disclosed implementations.

Machine-readable storage medium may comprise a memory of user device 200. The memory may comprise both volatile and/or nonvolatile memory and data storage components. Volatile components are those that do not retain data values upon loss of power. Nonvolatile components are those that retain data upon a loss of power. Thus, the memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

For example, machine-readable storage medium 220 may include instructions that perform operations to display a background area associated with a first application, display a foreground area associated with a second application, apply a degree of transparency to the foreground area such that the first application and the second application are both visible, create a trigger rule associated with the monitoring application, determine whether a metric value associated with the monitoring application satisfies the trigger rule, and in response to determining that the metric value associated with the monitoring application satisfies the trigger rule, display the monitoring application in front of the second application. In the example shown in FIG. 2, machine-readable storage medium 220 may comprise foreground area instructions 232, background area instructions 234, transparency application instructions 236, create trigger rule instructions 242, and trigger rule determination instructions 244.

In some implementations, background area instructions 234 may comprise instructions to update the background area according to a plurality of metric values received by the first application. For example, the first application may comprise a monitoring application that displays a graph of metric values as they are received. Background area instructions 234 may update the graph and refresh the display.

In some implementations, trigger rule determination instructions 244 may comprise instructions to determine whether at least one of the plurality of metric values received by the first application comprises an abnormal value according to the trigger rule. For example, the trigger rule may define an abnormal value as any value that changes from a previous value by more than 10%.

In some implementations, create trigger rule instructions 242 may comprise instructions to analyze the plurality of metric values to identify a range sleeve of normal values. For example, a range sleeve may be established based on a maximum and minimum value of the plurality of metrics. In some implementations, the range sleeve may be expanded by a percentage (e.g., 10% more than the maximum value and 10% less than the minimum value). The percentage expansion may be based on the absolute and/or relative difference between the maximum and minimum values.

In some implementations, foreground area instructions 232 and transparency application instructions 236 may comprise instructions to identify a relevant portion of the background area associated with the first application and apply the degree of transparency to an overlap area of the foreground area corresponding to the relevant portion of the background area. For example, the foreground area may overlap both a graphical representation of the plurality of metric values and a menu bar of the first application. The foreground area instructions 232 may comprise instructions to identify the graphical representation area associated with displaying the plurality of metric values as the relevant portion. Transparency application instructions 236 may apply the transparency to the portion of the foreground area overlapping the graph display and not the portion of the foreground area overlapping the menu bar.

In some implementations, machine-readable storage medium 220 may be encoded with executable instructions for displaying a user interface that enable a user to interact with one or more applications. As with display engine 122, the executable instructions encoded on machine-readable storage medium 220 may be a portion of an OS, a standalone application, a portion of a web browser, web-based script, and other similar formats. Display instructions 230 may display foreground and background areas associated with the first and second applications.

In some implementations, transparency application instructions 236 may apply a configurable degree of transparency to a foreground area associated with a second application, such as an email application, such that a background area associated with the first application, such as a monitoring application, may remain at least partially visible behind the foreground area.

Machine-readable storage medium 220 may also be encoded with executable instructions for analyzing metric values and creating and evaluating trigger rules. As with trigger engine 126, the executable instructions encoded on machine-readable storage medium 220 may be a portion of an OS, a standalone application, a portion of a web browser, web-based script, and other similar formats.

Trigger instructions 240 may determine whether a trigger rule associated with a first application, such as a monitoring application, has been satisfied and cause display instructions 230 to display the user interface associated with a monitoring application in front of the user interface associated with a second application instead of behind the second application. The trigger rule may be satisfied when an analysis of a plurality or metric values associated with a monitoring application has been used to create a the trigger rule and one of the metric values is determined to comprise an abnormal value. Trigger rule creation may comprise the trigger instructions 240 establishing baseline ranges for received metric values, identify abnormal metric values, and evaluate user actions with respect to the received metric values.

In some implementations, display instructions 230 and/or trigger instructions 240 may interact with each other and/or other applications through the use of an Application Programming Interface (API). In particular, an API of an application, whether locally-executed or web-based, may expose a number of functions to other applications. Similarly, an API of an operating system may expose a number of functions used to control the functionality of the OS.

For example, display instructions 230 may apply a degree of transparency to a foreground area associated with a second application via a window control API exposed by the operating system. Further, when foreground area instructions 232 and/or background area instructions 234 are implemented with respect to applications on top of the OS, launching and switching applications in response to user selection of an application control and/or in response to a trigger rule may be implemented using an API of the OS.

User interfaces may be displayed on an output device, similar to that of display 130 described above, comprising a display device, such as a cathode ray tube (CRT) monitor, a liquid crystal display (LCD) screen, or a screen implemented using another display technology. It should be apparent, however, that any suitable display may be used, provided that the user interfaces are displayed to the user. The output device may be internal or external to user interface display device 200 depending on the configuration of user interface display device 200.

Figure 3A:
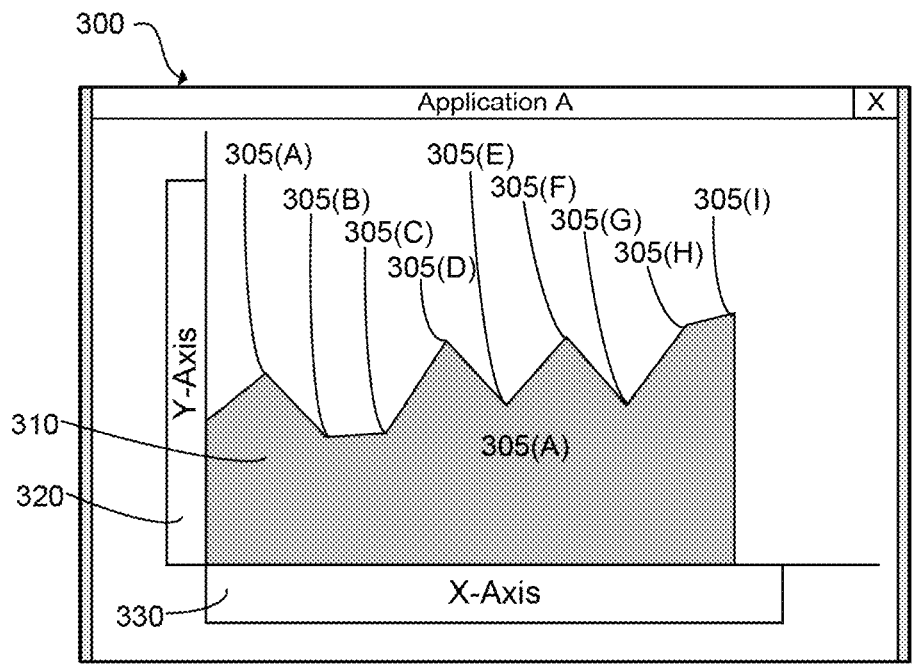
FIG. 3A is an example of a user interface for a first application consistent with disclosed implementations.

FIG. 3A is an example of a user interface 300 for a first application consistent with disclosed implementations. As illustrated, user interface 300 includes a series of metric value points 305(A)-(l) displayed on a graph 310 comprising a y-axis 320 and an x-axis 330. Although graph 310 is represented as a line graph for illustration purposes, other representations of metric value points 305(A)-(l) may be used in some implementations, such as bar graphs, data tables, pie charts, and the like. As new metric values are received from a data source (e.g., a network application providing update stock prices), the monitoring application may update graph 310 with the new data points.

Figure 3B:
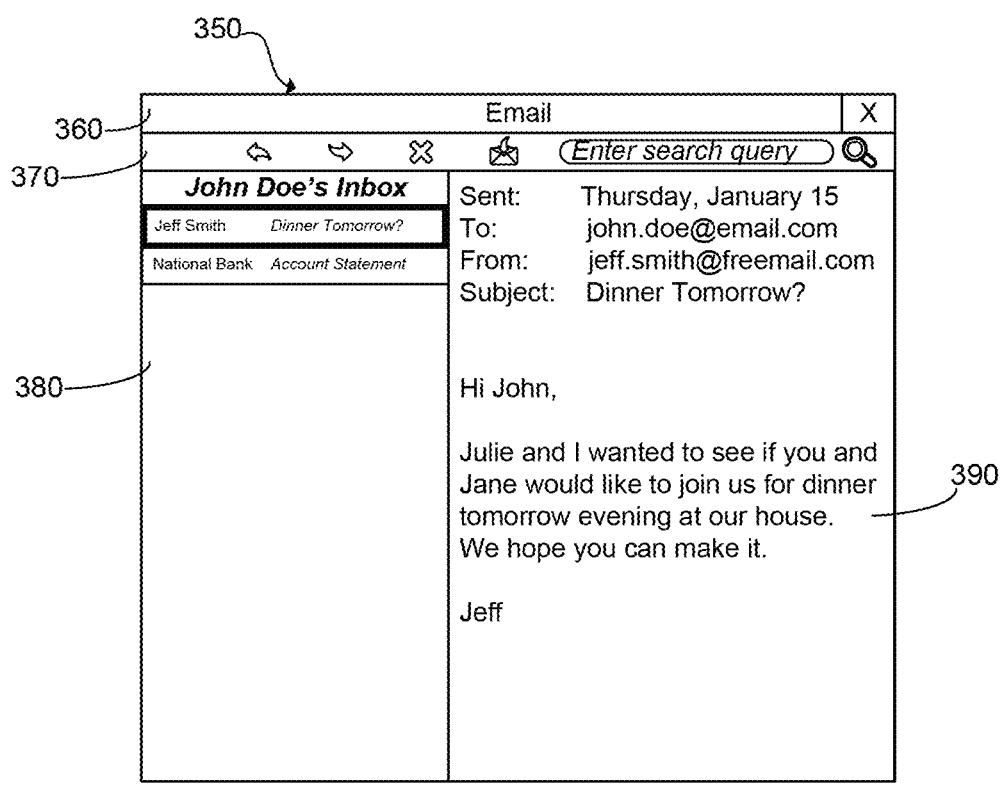
FIG. 3B is an example of a user interface for a second application consistent with disclosed implementations.

FIG. 3B is an example of an implementation of a user interface 350 for a second application consistent with disclosed implementations. The user interface may comprise a title bar 360, a menu bar 370, a first active area 380 and a second active area 390. User interface 350 may be associated with a foreground application that user 160 is currently interacting with via input device 155. As illustrated in FIG. 3B, the user application comprises an email application such that first active area 380 comprises a message list and second active area 390 comprises a selected message area with in which user 160 may be typing and/or reading.

Figure 4:
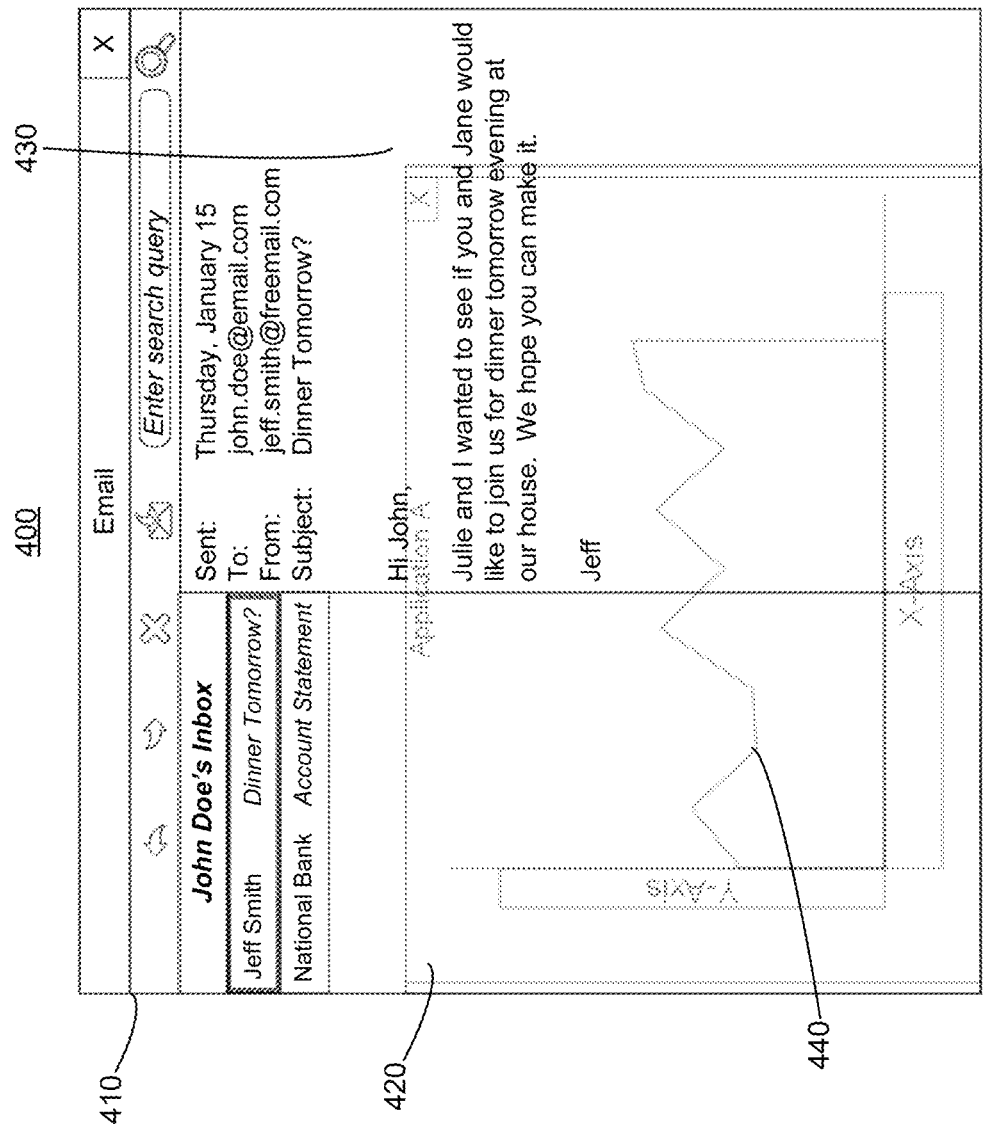
FIG. 4 is an example of applying a degree of transparency in a first application user interface consistent with disclosed implementations.

FIG. 4 is an example of applying a degree of transparency in a first application user interface 400 consistent with disclosed implementations. In particular, as illustrated, a first application 420 in a background area 144 may be overlapped by a second application 410 in a foreground area 142. Transparency engine 124 may apply a degree of transparency to foreground area 142. User 160 may continue to interact with an active area 430 of second application 410 while display engine 122 may continue to update a graph 440 in the display of first application 420 as metric values are received.

Consistent with some implementations, background area 144 of a user interface display, such as user interface 140 of display 130, may comprise a portion of the display where an application window is displayed behind at least one other application window. Foreground area 142 of a user interface display may comprise at least a portion of a window displayed in front of at least one other window. The foreground area may not be limited to that portion of the display occupied by an application window, but may comprise any portion of the display wherein the window is located in front of another window. Similarly, the background area may not be limited to that portion of the display occupied by an application window, but may comprise any portion of the display wherein the window is located behind another window.

Figure 5:
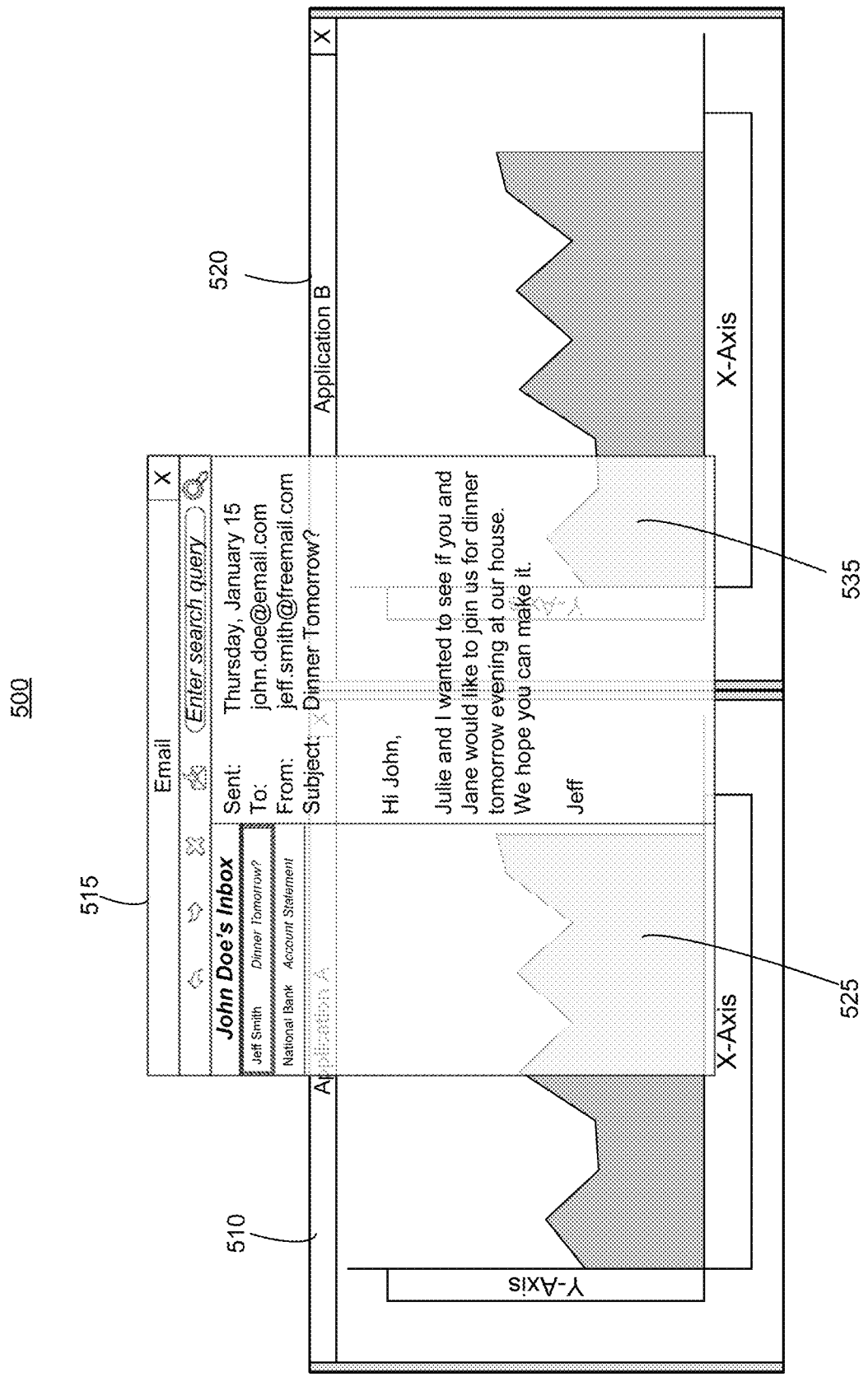
FIG. 5 is an example of applying a degree of transparency in a second application user interface consistent with disclosed implementations.

FIG. 5 is an example of applying a degree of transparency in a second application user interface 500 consistent with disclosed implementations. Second application user interface 500 may comprise a first application 510 displayed in background area 144 behind a second application 515 in foreground area 142. Second application user interface 500 may further comprise a third application 520 displayed in background area 144 behind second application 515. As illustrated, second application 515 comprises a first partial overlap area 525 with first application 510 and a second partial overlap area 535 with third application 520.

In this example, transparency engine 124 may apply a degree of transparency to second application 515 such that the applications 510, 520 remain visible to user 160 in their respective partial overlap areas 525, 535. This allows user 160 to continue to interact with second application 510 while being able to view updates in the applications 510, 520. In this example, the portions of the applications 510, 520 outside the respective partial overlap areas 525, 535 remain at their normal visibility while the portions within the respective partial overlap areas 525, 535 appear dimmer due to the transparency applied to the second application 515.

The degree of transparency applied to the second application 515 may be configurable by user 160 according to their preferences and/or may adjust according to a degree of contrast detected between the second application 515 and the applications 510, 520. For example, a monitoring application with a light colored data display may require a greater degree of transparency to be visible behind the foreground application.

Figure 6:
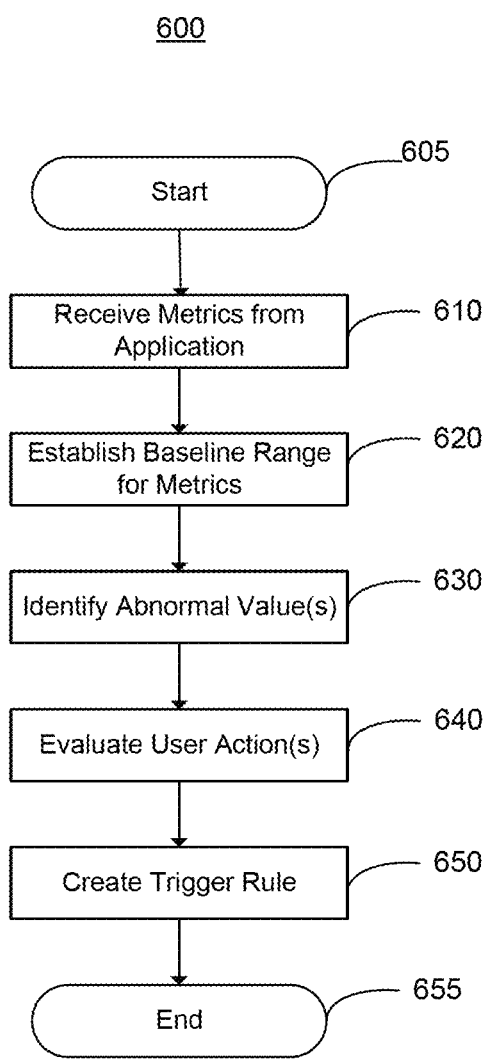
FIG. 6 is a flowchart of an example of a method for analyzing a plurality of metrics consistent with disclosed implementations.

FIG. 6 is a flowchart of an example of a method 600 for analyzing metrics consistent with disclosed implementations. Although execution of method 600 is described below with reference to the components of system 100, other suitable components for execution of method 600 will be apparent to those of skill in the art. Method 600 may be implemented in the form of executable instructions stored on a machine-readable storage medium, such as machine-readable storage medium 220 of user interface display device 200.

Method 600 may start in block 605 and proceed to block 610 where system 100 may receive a plurality of metrics associated with a monitoring application. The metric may be received by the monitoring application itself and/or may be received from and/or on behalf of the monitoring application by another application and/or the operating system of system 100. In some implementations, the metrics may comprise a series of measurement values associated with a monitored condition, such as computing resources in use, weather conditions, stock prices, etc. The plurality of metrics may be received over time as the measurements are made and/or may be received in batches of sequential and/or sampled measurements.

Method 600 may proceed to block 620, where system 100 may establish a baseline range for the metrics. For example, a range sleeve may be established by trigger engine 126 and/or create trigger rule instructions 242 based on a maximum and minimum value of the metrics. In some implementations, the range sleeve may be expanded by a percentage (e.g., 10% more than the maximum value and 10% less than the minimum value). The percentage expansion may be based on the absolute and/or relative difference between the maximum and minimum values.

Method 600 may proceed to block 630, where system 100 may identify an abnormal value. For example, the range of metrics may comprise a series of values that typically change less than 5% from measurement to measurement or typically differ less than 10% of the mean value of the plurality of metrics. Trigger engine 126 and/or create trigger rule instructions 242 may determine that a metric that comprises a 25% change from the prior metric or from the mean may thus comprise an abnormal value.

Method 600 may proceed to block 640, where system 100 may evaluate a user action with respect to the metric values.

For example, while displaying the received metrics in a background monitoring application, user 160 may choose to switch to the monitoring application and bring up more details about a given metric. Such an action may be interpreted, by trigger engine 126 and/or trigger instructions 240, to identify that metric value as one of interest to the user and so may be designated as an abnormal value.

Method 600 may proceed to block 650, where system 100 may create a trigger rule. For example, trigger engine 126 and/or create trigger rule instructions 242 may create a trigger rule comprising the range sleeve established at block 620, the abnormal value identified at block 630, and/or the value of interest identified at block 640. Method 600 may then end at block 655.

Figure 7:
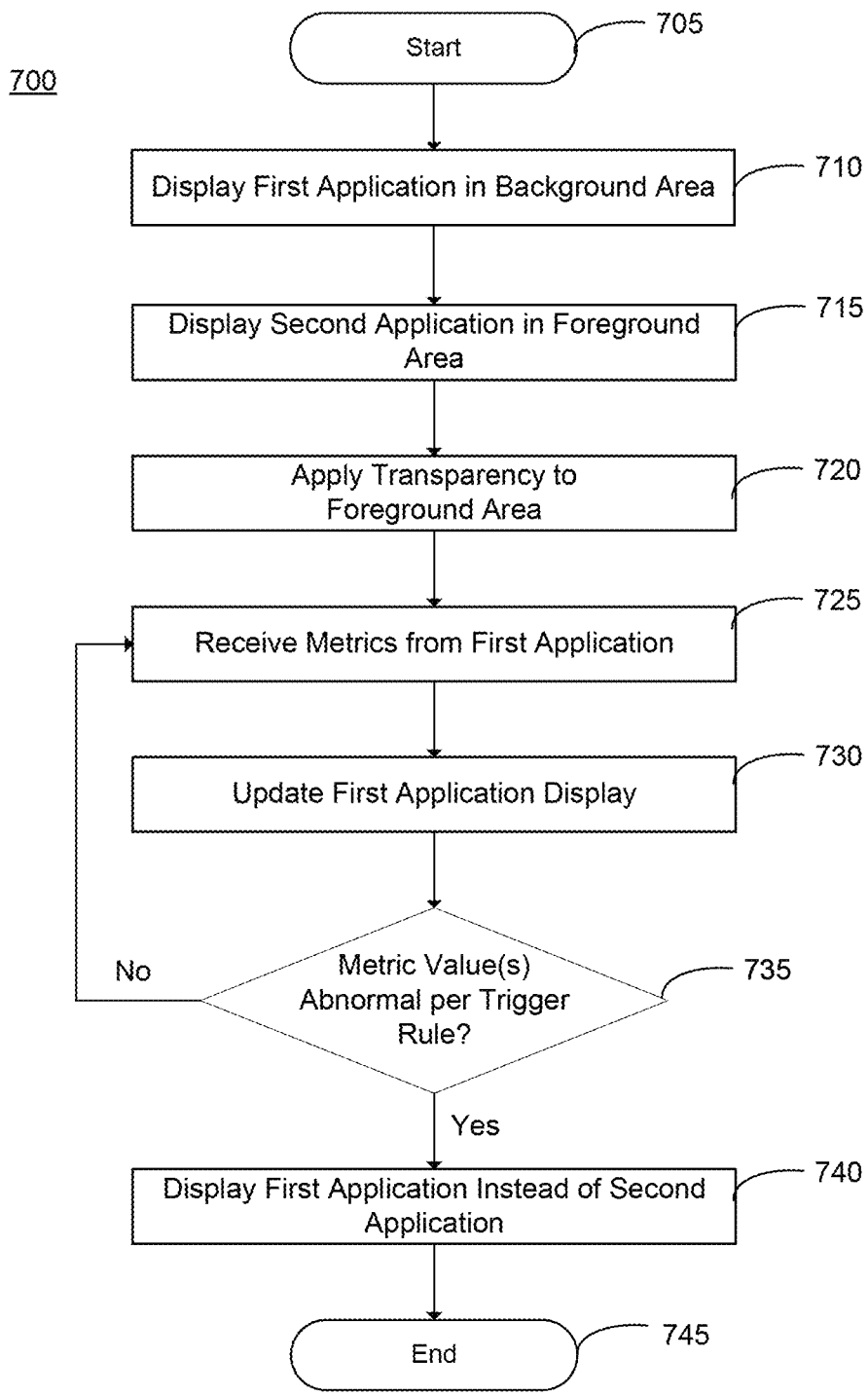
FIG. 7 is a flowchart of an example of a method for applying a degree of transparency consistent with disclosed implementations.

FIG. 7 is a flowchart of an example of a method 700 for applying transparency in application user interfaces consistent with disclosed implementations. Although execution of method 700 is described below with reference to the components of system 100, other suitable components for execution of method 700 will be apparent to those of skill in the art. Method 700 may be implemented in the form of executable instructions stored on a machine-readable storage medium, such as machine-readable storage medium 220 of user interface display device 200.

Method 700 may start in block 705 and proceed to block 710, where system 100 may display a first application in background area 144. In particular, the first application may comprise a monitoring application including a data display area that may be updated by display engine 122 and/or display instructions 230 as metric values are received such as that depicted in FIG. 3A.

Method 700 may then advance to block 715, where system 100 may display a second application in foreground area 142. In particular, the second application may include a plurality of user controls, each corresponding to a particular function. The second application may comprise an application such as a word processor, spreadsheet, web browser, email reader, game, music, movie, and/or other application with which a user may interact. In some implementations, multiple applications may be displayed by display engine 122 and/or display instructions 230 in the foreground area and/or the background area.

Method 700 may then advance to block 720, where system 100 may apply a degree of transparency to the second application in the foreground area. The degree of transparency may be configurable so as to allow the first application displayed behind the second application to still be visible without unduly interfering with the user's interactions with the second application. For example, a transparency degree of 20% may be applied by transparency engine 124 and/or transparency application instructions 236 to an email application with large areas of white space and text while a 40% degree of transparency may be applied to a movie application to allow for better visibility through the movement of the display.

Method 700 may then advance to block 725, where system 100 may receive metrics associated with the first application. For example, a stock monitoring application may receive a metric value comprising an updated stock price while a resource usage monitoring application may receive a metric value comprising an amount of memory or processor power in use by a server. Metrics may be received on a periodic basis (e.g., every five seconds) and/or may be received when an event to be measured occurs (e.g., a stock is traded on the market).

Method 700 may then advance to block 730, where system 100 may update the first application display. In particular, a monitoring application associated with a received metric may have its data display updated by display engine 122 and/or display instructions 230 to reflect the newly received value, such as by adding a data point to the end of a line graph.

Method 700 may then advance to block 735, where system 100 may determine whether the received metric value comprises an abnormal value according to a trigger rule. For example, a trigger rule created at block 650 of method 600 may be used to evaluate, by trigger engine 126 and/or trigger instructions 240, whether the metric falls outside of a range sleeve or comprises a value of interest to the user.

If the metric is determined not to comprise an abnormal value, method 700 may return to stage 725 where system 100 may continue to receive metrics associated with the first application. Otherwise, method 700 may advance to block 740, where system 100 may display the first application instead of the foreground application. For example, the first application may be displayed, by display engine 122 and/or display instructions 230, in front of the second application. In some implementations, the second application may retain the applied transparency with respect to other applications. In some implementations, transparency may be applied by transparency engine 124 and/or transparency application instructions 236 to the now foreground first application to enable the user to continue to view other applications situated behind the first application's window.

In some implementations, activity within the second application may be saved and/or paused until the user returns to that application. For example, a movie's playback may be paused or a word processing document may be saved. Method 700 may then end at block 745.

Although described above as comprising separate blocks, it should be apparent that the display of the particular interface areas need not occur in sequential order. Rather, in some implementations, the interface areas may be processed for display concurrently, such that some portions of a particular interface area are outputted to a display device prior to portions of another interface area.

The disclosed examples may include systems, devices, computer-readable storage media, and methods for progressive buffer generation. For purposes of explanation, certain examples are described with reference to the components illustrated in FIGS. 1 and 2. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are only used to distinguish one element from another.

Further, the sequence of operations described in connection with FIGS. 1-7 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

We claim:

1. A user device comprising:
   a display engine generating a graphical user interface including a window of a first application, a window of a second application, and an overlap area of a sub-portion of the window of the second application that covers a sub-portion of the window of the first application;
   a transparency engine applying a degree of transparency only to the overlap area that includes the sub-portion of the window of the second application and selecting the degree of transparency based on a plurality of stored transparency settings such that the window of the first application and the window of the second application are both visible in the overlap area; and
   a trigger engine that:
   receives a plurality of metric values associated with the first application; analyzes the plurality of metric values to determine an abnormal value; and creates a trigger rule based on a threshold related to the abnormal value;
   wherein a default change amount of the abnormal value is determined based on a first and a second user selection, and wherein the threshold is set based on the default change amount; and
   wherein after the trigger rule is created, user activity related to the second application is tracked and the threshold is changed based on at least some of the user activity;
   determines whether a trigger event associated with the first application has occurred, wherein the trigger event comprises the trigger rule that is satisfied by an additional metric value associated with the first application, and
   causes, in response to determining that the trigger event occurred, the display engine to change the degree of transparency of the overlap area.

2. The user device of claim 1, wherein the abnormal value is based on at least a first user selection associated with the first application and a second user selection associated with the first application.

3. The user device of claim 1, wherein an amount of the threshold is changed based on a second user selection associated with the first application.

4. The user device of claim 1, wherein the plurality of stored transparency settings comprises:
   a first transparency setting that specifies a first transparency level for a non-moving content type; and
   a second transparency setting that specifies a second transparency level for a moving content type.

5. A non-transitory machine-readable storage medium including instructions that, when executed by a processor, cause the processor to:
   generate a graphical user interface including a window of a first application, a window of a second application, and an overlap area of a sub-portion of the window of the second application that covers a sub-portion of the window of the first application;
   apply a degree of transparency only to the overlap area that includes the sub-portion of the window of the second application and select a degree of transparency based on a plurality of stored transparency settings such that the window of the first application and the window of the second application are both visible in the overlap area;

receive a plurality of metric values associated with the first application;

analyze the plurality of metric values to determine an abnormal value;

create a trigger rule based on a threshold related to the abnormal value;

wherein a default change amount of the abnormal value is determined based on a first and a second user selection;

wherein the threshold is set based on the default change amount; and wherein, after the trigger rule is created, user activity related to the second application is tracked and the threshold is changed based on at least some of the user activity;

determine whether a trigger event associated with the first application has occurred, wherein the trigger event comprises the trigger rule that is satisfied by an additional metric value associated with the first application; and cause, in response to determining that the trigger event occurred, the degree of transparency of the overlap area to change.

6. The non-transitory machine-readable storage medium of claim 5, including instructions to determine a relevant portion of the first application within the overlap area, and apply a first degree of transparency corresponding to the relevant portion wherein the first degree of transparency has a different transparency amount than the degree of transparency.

7. The non-transitory machine-readable storage medium of claim 6, wherein the relevant portion is a portion of the overlap area having a movement of the first application within the relevant portion.

8. The non-transitory machine-readable storage medium of claim 5, wherein the degree of transparency has a first degree of transparency and a second degree of transparency, and wherein the first degree of transparency is applied to an area inside of a clipping path within the overlap area and the second degree of transparency is applied to an area outside of the clipping path within the overlap area.

9. The non-transitory machine-readable storage medium of claim 5, comprising instructions to:
adjust the degree of transparency of only a portion of the overlap area based on an amount of white space in only the portion of the overlap area.

10. The non-transitory machine-readable storage medium of claim 5, wherein the trigger rule is based on a range of normal values including a maximum value and a minimum value, wherein the range of normal values is adjusted by a percentage, and wherein the percentage is based on an absolute and/or relative difference between the maximum value and the minimum value.

11. The non-transitory machine-readable storage medium of claim 5, wherein the plurality of stored transparency settings comprises:
a first transparency setting that specifies a first transparency level for a first amount of white space in the overlap area; and
a second transparency setting that specifies a second transparency level for a second amount of white space in the overlap area.

12. A method comprising:
generating a graphical user interface including a window of a first application, a window of a second application, and an overlap area of a sub-portion of the window of the second application that covers a sub-portion of the window of the first application;

applying a degree of transparency only to the overlap area that includes the sub-portion of the window of the second application;

selecting a degree of transparency based on a plurality of stored transparency settings such that the window of the first application and the window of the second application are both visible in the overlap area;

receiving a first plurality of metric values associated with the first application;

analyzing the first plurality of metric values to determine an abnormal value;

creating a trigger rule based on a threshold related to the abnormal value;

wherein a default change amount of the abnormal value is determined based on a first and a second user selection;

wherein the threshold is set based on the default change amount; and wherein, after the trigger rule is created, user activity related to the second application is tracked and the threshold is changed based on at least some of the user activity;

determining whether a trigger event associated with the first application has occurred, wherein the trigger event comprises the trigger rule that is satisfied by an additional metric value associated with the first application; and cause, in response to determining that the trigger event occurred the degree of transparency of the overlap area to change.

13. The method of claim 12, wherein after the trigger rule is created, a second plurality of metric values is received, and further comprising: determining a number of second abnormal metric values within the second plurality of metric values; and analyzing the second plurality of metric values to determine that the number of second abnormal metric values meets a threshold number.

14. The method of claim 12, further comprising:
adjusting the degree of transparency of the overlap area via a window control Application Programming Interface (API).

15. The method of claim 12, wherein the plurality of stored transparency settings comprises:
a first transparency setting that specifies a first transparency level for an email application type; and
a second transparency setting that specifies a second transparency level for a video application type.

16. The method of claim 15, wherein the second transparency level is higher than the first transparency level.

17. The method of claim 12, further comprising:
after causing the degree of transparency to change, pausing the second application in the graphical user interface.

* * * * *